No. 842,026. PATENTED JAN. 22, 1907.
G. W. SCOTT & J. DEADY.
WHIP ACTUATING DEVICE.
APPLICATION FILED AUG. 13, 1906.
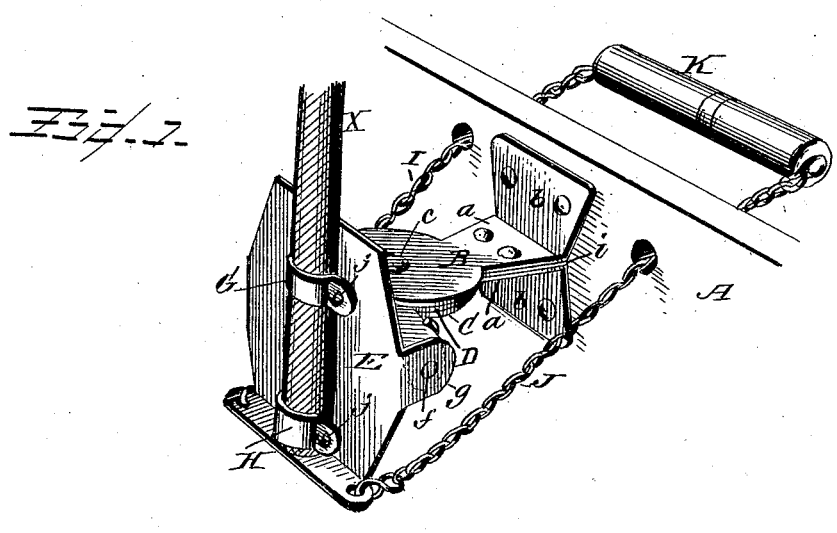
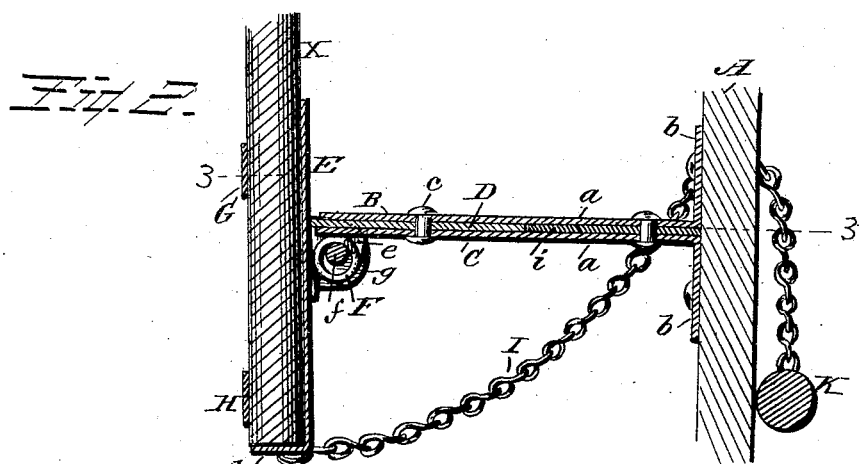
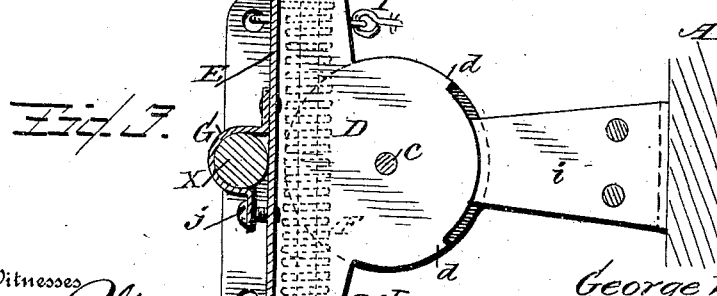
Witnesses
Inventors
George W. Scott.
John Deady,
By Chas. H. Fowler
Attorney

UNITED STATES PATENT OFFICE.

GEORGE W. SCOTT AND JOHN DEADY, OF TROY, OHIO; SAID DEADY ASSIGNOR TO SAID SCOTT.

WHIP-ACTUATING DEVICE.

No. 842,026.  Specification of Letters Patent.  Patented Jan. 22, 1907.

Application filed August 13, 1906. Serial No. 330,433.

*To all whom it may concern:*

Be it known that we, GEORGE W. SCOTT and JOHN DEADY, citizens of the United States, residing at Troy, in the county of Miami and State of Ohio, have invented certain new and useful Improvements in Whip-Actuating Devices; and we do hereby declare that the following is a full, clear, and exact description of the same, reference being had to the annexed drawings, making a part of this specification, and to the letters of reference marked thereon.

The present invention has for its object to provide a simple and effective and inexpensive whip-actuating device adapted for attachment to any part of a vehicle where it will be in convenient reach of the driver and in which provision is made for holding the whip and swinging it horizontally to either the right or left and also in a downward direction to strike the horse, as circumstances may require.

Figure 1 is a perspective view of our improved whip-actuating device; Fig. 2, a sectional elevation thereof; Fig. 3, a sectional plan view taken on line 3 3 of Fig. 2.

In the accompanying drawings, A represents any stationary object at the front of a vehicle to which the bracket-plates B C are attached in any preferred manner, or the device may be secured to the closed front of a vehicle where it is not convenient to use the whip from the inside, as we do not limit the invention to any particular means of attaching the device or to any particular part of the vehicle, this being left to the judgment of the user.

The plates B C are partly circular in form with rearward extensions $a$, which terminate in vertical clips $b$, extending at right angles to said plates, and are secured to the closed front or other part of the vehicle by suitable fastening means.

The plates B C extend, respectively, above and below a bracket D and are connected thereto by a central pivot-pin $c$, so that the bracket will have a horizontal movement to the right or left to direct the whip, as required.

The bracket D has stops $d$, as shown in Fig. 3 of the drawings, so as to limit the movement of the bracket, and has downwardly-extending ears $e$, to which is pivoted the whip-holder E by means of the pivot-rod $f$, said rod extending through ears $g$ on the whip-holder.

The whip-holder E is spring-actuated by any suitable means found most convenient so that when operated it will automatically resume its normal and upright position after being released by the driver. The most practical means for rendering the whip-holder automatic in its action is by means of the coiled spring F, which encircles the pivot-rod $f$ and has its ends bearing, respectively, against the bracket D and against the whip-holder E to give the spring the required leverage.

An interposed plate $i$ lies between the bracket-plates B C and is riveted thereto, so as to give the required space between said plates for the bracket D to freely operate.

The whip-holder E is constructed with a support $h$ for the end of the whip-handle X to rest, and said whip-handle is held against the holder by the clamps G H, which are composed of spring metal, one end of the clamps being riveted to the holder and the opposite end operated by a clamping-screw $j$ to draw the clamps tightly against the handle.

The whip-holder E is operated by any suitable means found best adapted to the purpose, and in the present instance is shown suitable chains I J, connected to the whip-holder and extending back through holes in the closed front or other stationary object and are secured to a suitable handle K within convenient reach of the driver.

Having now fully described our invention, what we claim as new, and desire to secure by Letters Patent, is—

A whip-actuating device comprising stationary bracket-plates having right-angle clips for attaching to the closed front or other portion of a vehicle, a bracket located between the plates and pivoted thereto, a spring-actuated whip-holder pivotally connected to the bracket, said holder having a supporting-flange for the handle of the whip and spring-clamps for securing it to the holder, and suitable means for operating the holder, substantially as and for the purpose described.

In testimony whereof we affix our signatures in presence of two witnesses.

GEORGE W. SCOTT.
JOHN DEADY.

Witnesses:
C. N. BURNS.
A. E. DEWRESE.